United States Patent [19]

Nishimura et al.

[11] Patent Number: 4,662,743

[45] Date of Patent: May 5, 1987

[54] METHOD OF MEASURING THE GEOMETRY OF OPTICAL FIBERS

[75] Inventors: Masayuki Nishimura, Durham; William H. Hatton, Raleigh, both of N.C.

[73] Assignee: Sumitomo Electric Research Triangle, Inc., Research Triangle Park, N.C.

[21] Appl. No.: 794,122

[22] Filed: Nov. 1, 1985

[51] Int. Cl.⁴ .................... G01N 21/01; G01N 21/88
[52] U.S. Cl. .................................................. 356/73.1
[58] Field of Search ...................................... 356/73.1

[56] References Cited

U.S. PATENT DOCUMENTS

| | | | |
|---|---|---|---|
| 3,982,816 | 9/1976 | Watkins | 356/73.1 |
| 4,027,977 | 6/1977 | Frazee, Jr. et al. | 356/73.1 |
| 4,067,651 | 1/1978 | Watkins | 356/73.1 |
| 4,349,276 | 9/1982 | De Vita | 356/73.1 |
| 4,362,943 | 12/1982 | Presby | 356/73.1 |
| 4,406,732 | 9/1983 | Kayoun | 356/73.1 |
| 4,492,463 | 1/1985 | Marcuse et al. | 356/73.1 |

OTHER PUBLICATIONS

"Automatic Geometric Measurements of Single-Mode and Multimode Optical Fibers", by D. Marcuse et al., Applied Optics, vol. 18, No. 3, Feb. 1979, p. 402.

*Primary Examiner*—Vincent P. McGraw
*Attorney, Agent, or Firm*—Richard E. Jenkins

[57] ABSTRACT

A method for measuring certain geometrical properties of an optical fiber wherein the coating is removed from adjacent one end of the fiber, a high intensity light source is focused at the bare fiber and coating interface in order to couple scattered light into the optical fiber cladding and the intensity distribution of the transmitted light at the end face of optical fiber is analyzed. In this fashion nonuniformities on the end face of the optical fiber will not substantially affect the accuracy of measurements of geometrical properties of the cladding region of the optical fiber.

12 Claims, 2 Drawing Figures

METHOD OF MEASURING THE GEOMETRY OF OPTICAL FIBERS

TECHNICAL FIELD

The present invention relates to a method for determining the geometrical properties of the cladding region of an optical fiber by measuring light transmitted through the cladding which is introduced into the cladding by a light source.

BACKGROUND ART

In view of the need for higher bit rate systems, longer lengths between repeaters, and connectorized cables, more rigorous specifications are being applied to optical fibers and cables. In order for optical fiber manufacturers to comply with the specifications, enhanced accuracy and repeatability must be achieved with respect to measurements conducted for transmission characteristics and geometrical properties of the optical fibers. It is known that the accuracy of these measurements is dependent in part on end face preparation of the fiber and that errors will occur in geometrical measurements if the end face of the fiber is not properly prepared.

High levels of repeatability and accuracy must be obtained on all geometrical parameters of optical fibers in view of the aforementioned greater stringency of specification requirements. It has been found that the fiber parameter which has the largest dependence on fiber end face preparation is the offset between the centers of the core and cladding which is commonly designated the "core/cladding offset". In view of the need for connectorized cables, specifications on core/cladding offset will be very stringent (less than 0.5 um) and repeatability of test results of less than 0.1 um will be a necessity. The method presently being used to determine optical fiber core parameters measures the intensity distribution of light transmitted through the core and the method being used to measure cladding parameters measures the intensity distribution of light reflected from the end face of the test optical fiber. The latter measurement presents a problem in that any nonuniformities or imperfections on the end face of the optical fiber will greatly affect the distribution of reflected light and therefore the reproducibility and accuracy of the measurement. This results in a high and unacceptable level of dependency on proper end face preparation of the optical fiber for accurate measurement of cladding parameters by light reflected from the end face of the test fiber.

DISCLOSURE OF THE INVENTION

The method according to the present invention provides for a new method of measurement for determining the cladding parameters of an optical fiber by measuring transmitted light that has been coupled into the cladding region. The geometrical parameters of the fiber core are conventionally measured by the intensity distribution of light transmitted through the core. It has been found that for short lengths of bare fiber cladding modes will propagate since the refractive index of ambient air is significantly lower than that of the cladding. Therefore, by completely filling the cladding region with light the geometrical properties of the cladding may be determined.

The method of the present invention comprises removing the optical fiber coating from the measurement end of the test fiber, directing a high intensity light source onto the coating and bare fiber interface so that scattered light from the interface will be coupled into the cladding region, and determining the geometrical cladding parameters by analyzing the intensity distribution across the end face of the test fiber with a suitable system such as an image processing device and electrically connected computer. In this fashion the transmitted cladding intensity has only a small dependence on optical fiber end face preparation and, therefore, accuracy and repeatability of the measured values will be substantially increased.

Thus, an important object of the present invention is to provide an improved method of measuring the geometry of optical fibers.

More specifically, an object of the present invention is to provide an improved method for measuring cladding parameters which is not dependent on fiber end face preparation.

Still a further object of the present invention is to provide a method for measuring optical fiber cladding parameters which has a higher degree of reproducibility and accuracy than has heretofore been known.

BRIEF DESCRIPTION OF DRAWINGS

The above and other features of the invention will now be described in detail with reference to the accompanying drawings in which.

BEST MODE FOR CARRYING OUT THE INVENTION

Figure 1:
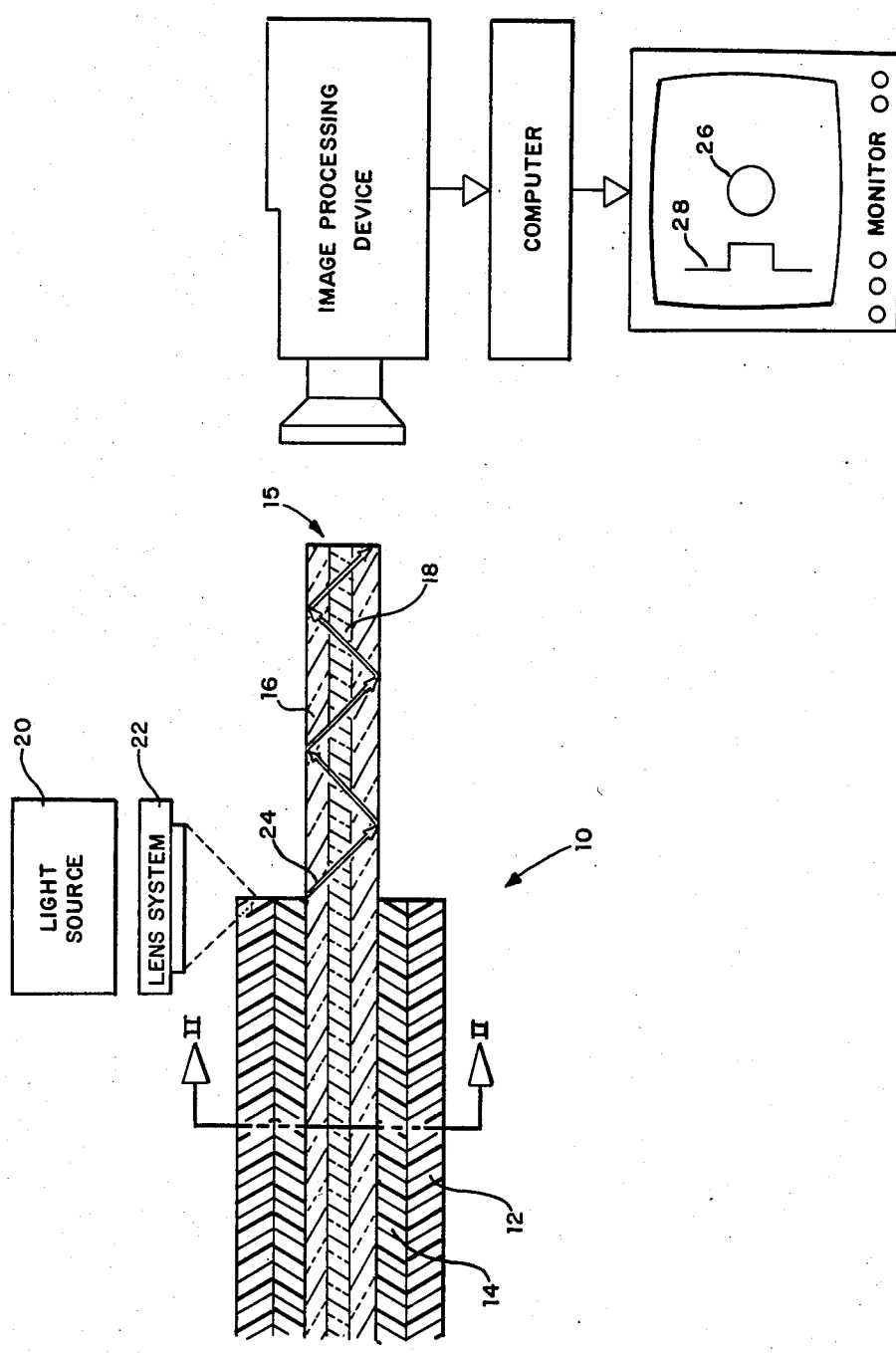
FIG. 1 is a diagrammatic representation of the improved method for measuring the geometry of optical fibers in accordance with the present invention.
Figure 2:
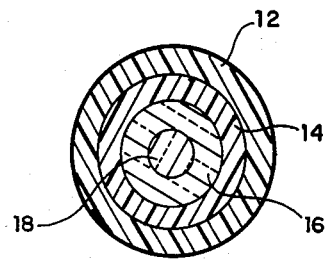
FIG. 2 is a cross-sectional view of the optical fiber to be examined, taken on the line II—II of FIG. 1 and drawn to a greatly enlarged scale.

Referring to FIGS. 1 and 2, the new method for measuring geometrical properties of the cladding region by means of transmitted light may be clearly understood and appreciated. As best seen in the diagrammatic representation of FIG. 1, an optical fiber, generally designated 10, is prepared for measurement by removing coating layers 12 and 14 to produce a bare fiber length of about 1-2 centimeters. The end face, generally designated 15, of the bare fiber section is prepared by conventional fiber cleaving techniques. Total length of the bare fiber section of test fiber 10 after cleaving is typically about 16 millimeters. The coating layers may typically be nylon for outer layer 12 and silicone for inner layer 14. The bare fiber end remaining consists of cladding 16 and core 18. A high intensity light source 20 is focused by lens system 22 at the interface of the bare fiber and coating so that scattered light from the interface will be coupled into cladding 16. It is known in the fiber optics art that for short lengths of bare optical fiber cladding modes 24 will propagate through the fiber since the refractive index of cladding 16 is substantially greater than that of air. The cladding parameters are then determined by analyzing the transmitted light intensity distribution across end face 15 of optical fiber 10 with a conventional image processing device electrically connected to a computer and monitor. A representational fiber end face 26 and corresponding intensity distribution curve 28 are depicted on the screen of the monitor for clarity of understanding. In this fashion the cladding transmitted light intensity has only a small dependence on the end face preparation of the optical fiber and consequently the geometrical measurement accuracy and repeatability of the measured values is enhanced.

The prior art method utilizes measurement of the intensity distribution of transmitted light in order to determine optical fiber core parameters and measurement of the intensity distribution of reflective light from the optical fiber end face in order to determine cladding parameters. The aforementioned difficulty with this prior art method is that any nonuniformities or imperfections on the optical fiber end face will greatly affect the distribution of the reflective light and decrease reproducibility and accuracy of the results. This can be clearly seen in Table 1 and Table 2 below which set forth experimental results from a repeatability study conducted with both the prior art method and the new method in order to determine how optical fiber end face preparation affected the measured parameters. Six nylon coated optical fibers were measured by both the prior art method and the novel method of the present invention. Optical fiber end face preparation was conducted twice in order to determine measurement repeatability of the two methods. Table 1 illustrates the measured results in um for the cladding diameter measurement. It can be observed from these results that the variation in cladding diameter measurement due to end face preparation was less for the method of the invention.

TABLE 1

Measured Cladding Diameters for Prior Art Method and New Method

| FIBER | PRIOR ART METHOD (CUTS) | | | NEW METHOD (CUT) | | |
|---|---|---|---|---|---|---|
| | #1 | #2 | #2 − #1 | #1 | #2 | #2 − #1 |
| Yellow | 126.6 | 126.5 | −.1 | 127.9 | 127.0 | −.9 |
| Blue | 126.5 | 126.4 | −.1 | 126.1 | 126.2 | +.1 |
| Green | 126.5 | 126.7 | +.2 | 127.0 | 127.4 | +.4 |
| Red | 125.1 | 124.5 | −.6 | 124.4 | 124.3 | −.1 |
| White | 126.5 | 126.2 | −.3 | 126.4 | 126.3 | −.1 |
| Purple | 124.8 | 124.4 | −.4 | 126.1 | 126.2 | +.1 |

Table 2 illustrates the results of the measurement of the core/cladding offset in um with both the prior art method and method of the present invention. It should be noted that in this test a significantly higher reproducibility was observed for the method of the present invention as opposed to the prior art method.

TABLE 2

Measured Core/Cladding Offsets for Prior Art Method and New Method

| FIBER | PRIOR ART METHOD (CUTS) | | | NEW METHOD (CUTS) | | |
|---|---|---|---|---|---|---|
| | #1 | #2 | #2 − #1 | #1 | #2 | #2 − #1 |
| Yellow | .1 | .3 | +.2 | .2 | .4 | +.2 |
| Blue | .4 | .5 | +.1 | .1 | .4 | +.3 |
| Green | 1.2 | .6 | −.6 | .3 | .2 | −.1 |
| Red | .4 | .8 | +.4 | .3 | .3 | 0 |
| White | .4 | .5 | +.1 | .3 | .4 | +.1 |
| Purple | .9 | 1.0 | +.1 | .3 | .3 | 0 |

Therefore, it can be seen that a new optical fiber geometrical measuring system has been developed which utilizes transmitted light instead of reflected light to measure geometrical parameters of optical fiber cladding. This method has been found to be particularly advantageous in that the repeatability of the measured cladding parameters will be greater since the results are less dependent on optical fiber end face preparation.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent methods.

What is claimed is:

1. A method for determining certain geometrical properties of an optical fiber including the steps of:
    removing the coating adjacent one end of the optical fiber;
    directing a light source at the juncture of the fiber coating and the bare fiber; and
    analyzing the intensity distribution of the transmitted light at the end face of the bare end of the fiber.

2. A method according to claim 1 wherein the light source is a high intensity light.

3. A method according to claim 2 wherein the light is a white light.

4. A method according to claim 3 wherein the light is focused on the optical fiber by a lens system.

5. A method according to claim 1 wherein the refractive index of the cladding is higher than that of ambient air around the optical fiber.

6. A method according to claim 1 wherein the transmitted light is analyzed by an image processing device electrically connected to a computer.

7. A method for determining certain geometrical properties of the cladding of an optical fiber including the steps of:
    removing the coating adjacent one end of the optical fiber;
    directing a high intensity light source substantially perpendicularly to the longitudinal axis of the fiber at the juncture of the fiber coating and the bare fiber; and
    analyzing the intensity distribution of the light transmitted through the fiber at the end face of the bare end of the fiber with a image processing device and electrically connected computer.

8. A method according to claim 7 wherein the light source is a white light.

9. A method according to claim 8 wherein the light is focused on the optical fiber by a lens system.

10. A method according to claim 7 wherein the refractive index of the cladding is higher than that of ambient air about the fiber.

11. A method according to claim 7 including the step of cleaving the bare fiber end prior to directing the light source at the juncture of the fiber coating and bare fiber.

12. A method according to claim 11 wherein the length of uncoated fiber after cleaving is about 16 millimeters.

* * * * *